(12) United States Patent
Hawman

(10) Patent No.: US 7,616,798 B2
(45) Date of Patent: Nov. 10, 2009

(54) METHOD FOR FASTER ITERATIVE RECONSTRUCTION FOR CONVERGING COLLIMATION SPECT WITH DEPTH DEPENDENT COLLIMATOR RESPONSE MODELING

(75) Inventor: Eric G. Hawman, Schaumburg, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 734 days.

(21) Appl. No.: 11/237,187

(22) Filed: Sep. 28, 2005

(65) Prior Publication Data

US 2006/0098857 A1    May 11, 2006

(51) Int. Cl.
*G06K 9/00* (2006.01)

(52) U.S. Cl. .................................... 382/128; 382/131
(58) Field of Classification Search ................ 382/128, 382/131; 600/431
See application file for complete search history.

(56) References Cited

U.S. PATENT DOCUMENTS 5,390,225 A * 2/1995 Hawman ...................... 378/6
6,171,243 B1 * 1/2001 Gagnon et al. .............. 600/431

* cited by examiner

*Primary Examiner*—Tom Y Lu

(57) ABSTRACT

A method of iteratively reconstructing images from data acquired by converging collimation SPECT, comprising the steps of dividing a reconstruction space into multiple iso-resolution zones that are oriented non-parallel to the detector, and correcting for attenuation by applying a same attenuation value to all voxels in the same iso-resolution zone.

12 Claims, 2 Drawing Sheets

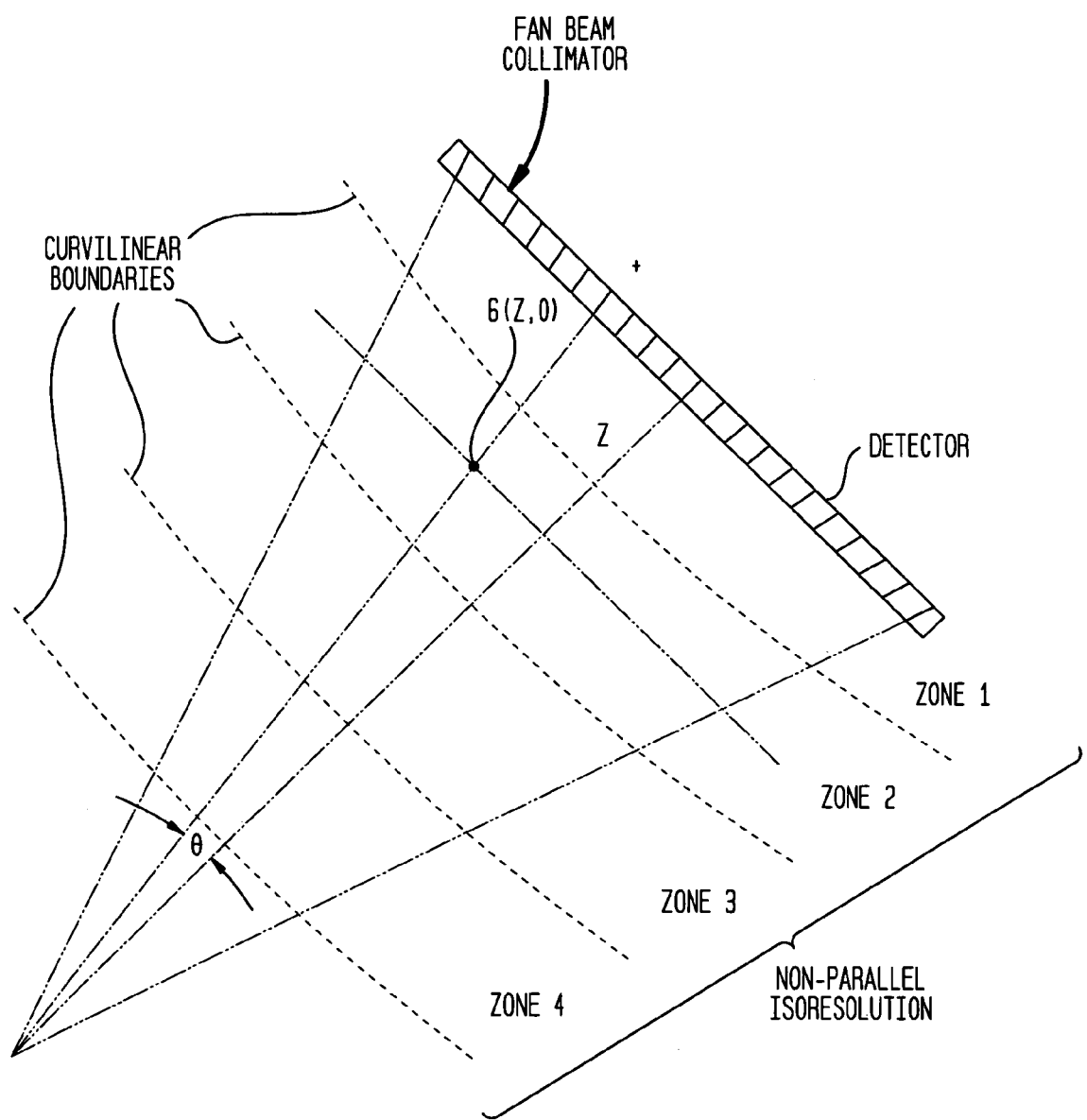

METHOD FOR FASTER ITERATIVE RECONSTRUCTION FOR CONVERGING COLLIMATION SPECT WITH DEPTH DEPENDENT COLLIMATOR RESPONSE MODELING

BACKGROUND OF THE INVENTION

1. Field of the Invention

This invention relates to nuclear medicine, and particularly relates to nuclear imaging. More particularly it relates to SPECT (Single Photon Emission Computed Tomography) studies which are carried out to form tomographic images. In its most immediate sense, the invention relates to a method of iterative reconstruction of SPECT images from acquired SPECT data.

2. Description of the Background Art

In a conventional SPECT study of an organ such as the heart, a radioisotope (Tc-99m, Tl-201, for example) is administered to the patient and the radioisotope is taken up by the heart muscles. Then, the patient is placed in a scintillation camera system and one or more scintillation camera detectors are rotated about the long axis of the patient. These detectors interact with gamma radiation emanates from the patient, and the resulting data is used to form three-dimensional images ("SPECT images" or "tomographic images") of the distribution of the radioisotope within the patient.

Such three dimensional SPECT images can be calculated based on a set of two-dimensional images ("projections" or "projection images") acquired by the scintillation camera system; this calculation process is known as image reconstruction. Some of the more common algorithms for image reconstructions are simple back-projection, filtered back-projection, Fourier transformation reconstruction, and a group of algorithms collectively called iterative reconstruction (for example, LSIT: Least Squares Iterative Techniques; ART: Algebraic Reconstruction Techniques; SIRT: Simultaneous Iterative Reconstruction Techniques; gradient and conjugate gradient; maximum entropy; ML-EM: Maximum Likelihood Expectation Maximization; and OSEM: Ordered Subset Expectation Maximization).

Iterative reconstruction methods involve solving a set of algebraic equations to reconstruct the image. The general process is as follows:
  a. The computer makes an initial "guess" at the form of the reconstructed image and creates an initial "guess" image;
  b. The initial "guess" image matrix is re-projected or back-projected along the original projections;
  c. The projection of the "guess" image is compared to the real projection data;
  d. The counts/pixel in the image matrix are adjusted until the projection agrees with the real projection data;
  e. Steps b-d are repeated for each angle and projection; and
  f. The process stops when most of the projections of the image are sufficiently close to the values of the original projection data (i.e. when the process has reached "convergence").

As a result, the iterative reconstruction methods are very computer- or calculation-intensive. Until recently, the computing power needed to perform this kind of iterative reconstruction was not readily available in the clinic.

On the other hand, iterative reconstruction methods have advantages over other, simple back-projection methods. For example, the filtered back-projection method reconstructs images from direct calculations from collected projections of activity, and assumes no attenuation of activity. The back-projection thus does not correct the images for attenuation. The iterative reconstruction methods, however, have the ability to correct some of the factors that degrade images in filtered back-projection. For example, the iterative reconstruction methods can correct for attenuation of activity, depth dependent blurring and scatter effects. Therefore, it would be advantageous to provide a method for a faster iterative reconstruction or an iterative reconstruction method requiring less computing power.

In a parallel beam modeling, a reconstruction method called a zoned method is known. A reconstruction space is divided into multiple depth zones that are oriented parallel to the detector. Projection operations are performed for all voxels (volume elements) in one depth zone before handling the next depth zone. For each depth zone, the expanded projection data is convolved with a kernel so that the net projection blur is representative of the average spatial resolution for that zone. The order of zone handling is from nearest the detector to the farthest for back-projection (reversed for projection). This ordering permits the beam function to be modeled with successive convolutions. The central limit property of multiple convolutions is used in approximating a Gaussian beam; efficiency is gained through the use of RECT functions, where convolution requires only 2 additions and 1 multiplication operation per subpixel. Additionally, use of the RECT function on a subpixel matrix allows generation of non-RECT approximations of narrow Gaussians at the pixel level. Projection and back-projection computations are confined to the object and projection support regions. Ray-sum attenuation values are stored for each angle, and applied separately from the blurring operation. Only 1 add and 1 multiply are needed per voxel, for projection or back-projection. These methods can accelerate computation speed 8- to 10-fold and "Fast projection and back-projection with modeling of attenuation and depth dependent resolution for iterative SPECT reconstruction," J. Nucl. Med., 39(5):79P, and U.S. Pat. No. 5,390,225 are incorporated herein by reference in their entirety.

SUMMARY OF THE INVENTION

One aspect of the invention relates to a method for faster iterative reconstruction for converging collimation SPECT with depth-dependent collimator response modeling.

Another aspect of the invention relates to iterative reconstruction using non-parallel iso-resolution slabs in modeling.

Another aspect of the invention relates to a computer system that carries out such an iterative reconstruction.

Another aspect of the invention relates to a SPECT imaging apparatus conducting such an iterative reconstruction.

BRIEF DESCRIPTION OF THE DRAWINGS

The invention will be better understood with reference to the following illustrative and non-limiting drawings, in which:

FIG. 2 is a diagram showing that the zone boundaries are assumed to be curvilinear to the collimator for a fan beam collimator, which is a type of converging collimator, which also can be used with the present invention.

DETAILED DESCRIPTION OF PREFERRED EMBODIMENTS

Figure 1:
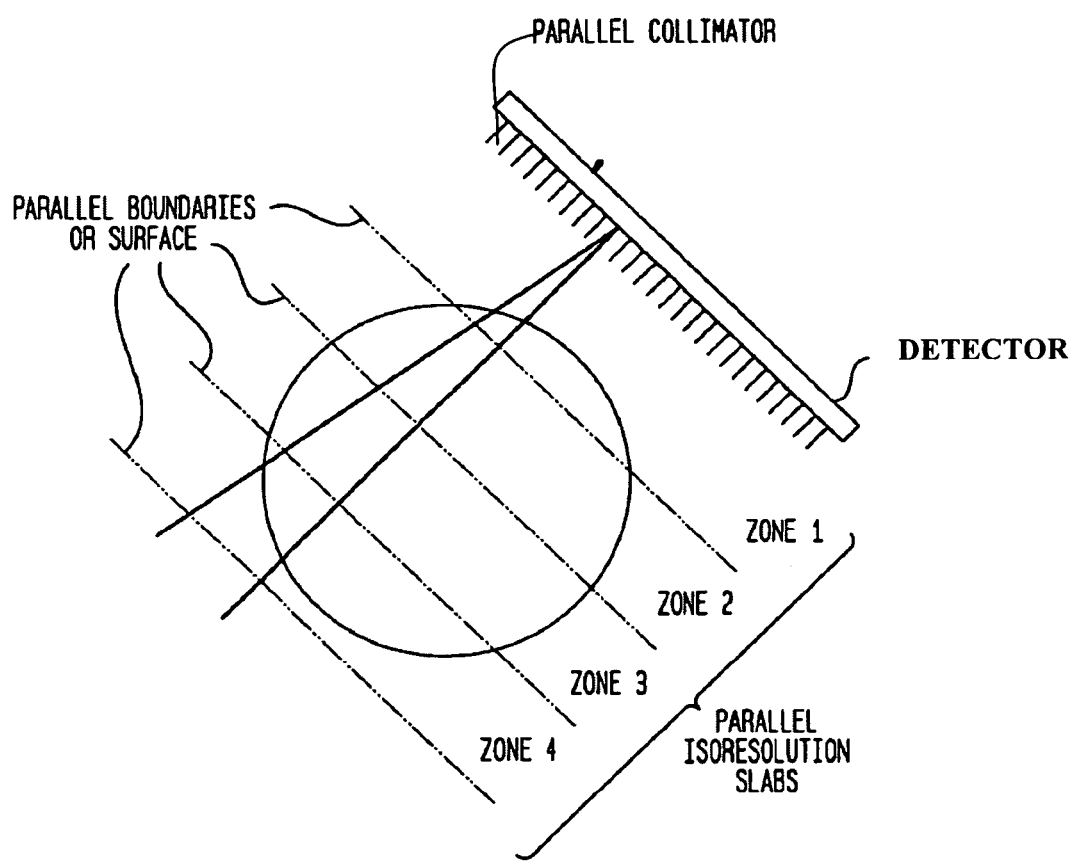
FIG. 1 is a diagram showing that the zone boundaries are assumed to be parallel to the collimator for parallel beam collimators, which can be used with the present invention.

As shown in FIG. 1, according to the invention the imaging space in front of a detector is divided into a number of iso-resolution zones (zone 1, zone 2, zone 3, . . . , zone n), where any two adjacent zone boundaries define iso-resolution slabs or volumes in which the spatial resolution is assumed to be constant, and thus wherein all voxels in each slab are assigned the same attenuation value. For a parallel collimator detector as illustrated in FIG. 1, the zone boundaries are defined to be parallel to the collimator. For converging collimators such as the fan beam collimator shown in FIG. 2, the iso-resolution slabs are assigned shapes other than parallel slabs so that the attenuation value assumed to be constant in each slab better reflects the actual attenuation profile, but still enables the 1 add and 1 multiply operation as it is carried out for a parallel collimator. For example, with a fan beam collimator as shown in FIG. 2, the resolution generally varies as a function of field position and depth. See "Characterization of fan beam collimators," Fur. J. Nucl. Med., 28 (2):144-49 (February 2001), which is incorporated herein in its entirety by reference. Details of iso-resolution boundaries, surfaces, zones or slabs depend on the particular collimator design.

Therefore, a scheme for zoned projection with the resolution modeling is as follows. An outer loop of computation over different projection angles or views has a first inner loop over zones, which are either parallel or non-parallel slabs in accordance with collimator design. The first inner loop addresses zones from the one with the greatest blur to the one with the least. The first inner loop over zones has a second inner loop over all voxels in a zone, wherein all voxels in a zone are assigned the same attenuation value, and therefore, each projection of a voxel requires only 1 add and 1 multiply operation. Attenuation correction is applied by the 1 multiply step. The first inner loop over zones also has an operation applying incremental blur for the collimator model, but this operation is kept outside the inner loop over all voxels in a zone, making the computation much more efficient. It is typically 10 to 100 times faster. A scheme for back-projection is similar to the scheme for projection, but the zones are addressed in the reverse sequence, i.e. from the one with the least blur to the one with the greatest.

The general method of curvilinear zones (i.e. non-parallel slabs) of iso-resolution can be applied to other types of converging (or diverging) collimators such as cone beam, pinhole or astigmatic collimators.

Therefore, according to one embodiment of the invention, a method of iteratively reconstructing images from converging collimation SPECT data comprises the steps of dividing a reconstruction space into multiple iso-resolution zones that are oriented non-parallel to the detector, and correcting for attenuation by applying a single attenuation value to all voxels in the same iso-resolution zone.

Correction for attenuation can be carried out by a calculation scheme comprising a loop over angles or views comprising a first inner loop over zones, which zones are non-parallel slabs, wherein the first inner loop over zones addresses zones from a zone with the greatest blur to a zone with the least, and comprises a second inner loop over all voxels in a zone, wherein all voxels in a zone are assigned the same attenuation value. Such a calculation scheme can also comprise only 1 add and 1 multiply operation for each projection of a voxel, wherein the attenuation value is applied by the 1 multiply step. Such a calculation scheme can also comprise an inner loop over zones comprising an operation applying incremental blur for the particular collimator model. Such a calculation scheme can keep such an operation outside the inner loop on all voxels in a zone.

Such a calculation scheme can also comprise a back-projection comprising a loop over angles or views comprising a first inner loop over zones, which are non-parallel slabs. Such an inner loop over zones in such a back-projection can address zones from a zone with the least blur to a zone with the greatest. Such an inner loop over zones in such a back-projection can also comprise an inner loop over all voxels in a zone, wherein all voxels in a zone are assigned the same attenuation value. Such back-projection of a voxel can be carried out by only 1 add and 1 multiply operation, wherein said attenuation value is applied by said 1 multiply step. Such an inner loop over zones in such a back-projection can also comprise an operation applying incremental blur for collimator model. Such an operation can be kept outside the inner loop on all voxels in a zone.

Another aspect of the invention is embodied as a computer carrying out any of the above mentioned calculations. And, a still further aspect of the invention is embodied as a SPECT imaging apparatus that acquires image data and processes it using any of the above-mentioned methods or calculations. A fan beam, pinhole or astigmatic collimator can be used in acquiring the image data.

The invention claimed is:

1. A method of iteratively reconstructing nuclear medical images of a subject from imaging data acquired by converging collimation SPECT, comprising the steps of:
   a. defining a physical reconstruction space from which imaging data is acquired from said subject as having a plurality of iso-resolution zones having boundaries that are oriented non-parallel to the surface of a SPECT detector, wherein each iso-resolution zone has a constant spatial resolution with respect to imaging data acquired therefrom by said detector,
   b. correcting said acquired imaging data for attenuation by applying a same attenuation value to all acquired imaging data from the same iso-resolution zone, and
   c. reconstructing a nuclear medical image of said subject from said attenuation-corrected imaging data.

2. The method of claim 1, wherein said converging collimation SPECT data acquisition uses a fan beam collimator.

3. The method of claim 1, wherein said converging collimation SPECT data acquisition uses a pinhole collimator.

4. The method of claim 1, wherein said converging collimation SPECT data acquisition uses an astigmatic collimator.

5. The method of claim 1, wherein the step of reconstructing uses a calculation scheme for zoned projections comprising a first computation loop over different projection angles or views, a first inner loop over zones, which zones are non-parallel slabs, wherein said first inner loop over zones addresses zones from a zone with the greatest blur to a zone with the least blur, and a second inner loop over all voxels in a zone, wherein all voxels in a zone are assigned a same attenuation value.

6. The method of claim 5, further comprising the step of carrying out only 1 add and 1 multiply operation for each projection of a voxel, wherein said attenuation value is applied by said 1 multiply operation.

7. The method of claim 6, wherein said inner loop over zones further comprises an operation applying incremental blur for a collimator model of a particular collimator being used in the data acquisition.

8. The method of claim 7, wherein said operation is kept outside said second inner loop on all voxels in a zone.

9. The method of claim 8, wherein said reconstructing step further comprises a calculation step for back-projection, comprising a first computation loop over angles or views, a first inner loop over zones, which are non-parallel slabs, wherein said first inner loop over zones addresses zones from a zone with the least blur to a zone with the greatest blur, and a second inner loop over all voxels in a zone, wherein all voxels in a zone are assigned a same attenuation value, and each projection of a voxel requires only 1 add and 1 multiply operation.

10. The method of claim 9, wherein said attenuation value is applied by said 1 multiply step and an operation applying incremental blur for said collimator model, wherein said operation is kept outside said second inner loop over all voxels in a zone.

11. A computer readable medium storing computer executable instructions for iteratively reconstructing nuclear medical images of a subject from imaging data acquired by converging collimation SPECT, said computer executable instructions including instructions for:
 a. defining a physical reconstruction space from which imaging data is acquired from said subject as having a plurality of iso-resolution zones having boundaries that are oriented non-parallel to the surface of a SPECT detector, wherein each iso-resolution zone has a constant spatial resolution with respect to imaging data acquired therefrom by said detector,
 b. correcting said acquired imaging data for attenuation by applying a same attenuation value to all acquired imaging data from the same iso-resolution zone, and
 c. reconstructing a nuclear medical image of said subject from said attenuation corrected imaging data.

12. A SPECT imaging apparatus for reconstruction of image data projections according to the method of claim 1.

* * * * *